United States Patent [19]

Shimokawa

[11] Patent Number: 5,416,888
[45] Date of Patent: May 16, 1995

[54] NEURAL NETWORK FOR FUZZY REASONING

[75] Inventor: Yoshiyuki Shimokawa, Tokyo, Japan

[73] Assignee: Kabushiki Kaisha Toshiba, Kawasaki, Japan

[21] Appl. No.: 113,514

[22] Filed: Aug. 30, 1993

Related U.S. Application Data

[63] Continuation of Ser. No. 780,335, Oct. 22, 1991, abandoned.

[30] Foreign Application Priority Data

Oct. 22, 1990 [JP] Japan .................. 2-283679

[51] Int. Cl.⁶ .................. G06F 9/44; G05B 13/00
[52] U.S. Cl. .................. 395/22; 395/24; 395/900
[58] Field of Search .................. 395/22, 24, 900

[56] References Cited

U.S. PATENT DOCUMENTS

| | | | |
|---|---|---|---|
| 4,922,423 | 5/1990 | Takahashi | 395/900 |
| 5,073,863 | 12/1991 | Zhang | 395/3 |
| 5,095,443 | 3/1992 | Watanabe | 395/23 |
| 5,168,549 | 12/1992 | Takagi et al. | 395/900 |

OTHER PUBLICATIONS

Furuya et al, "NFS: Neuro Fuzzy Inference System," Jun. 1989.
Lippmann, "An Introduction to Computing with Neural Nets," IEEE ASSP Magazine, Apr., 1987, pp. 4–22.
Keller et al, "Fuzzy Logic Inference Neural Networks," SPIE vol. 1192 (1989) pp. 582–591.
Moser et al, "Skeletonization: A Technique for Trimming the Fat From a Network Via Relevance Assessment," Advances in Neural Information Processing Systems I, 1989, pp. 107–115.
Nguyen et al "Neural Networks for Self-Learning Control Systems," IEEE Control Systems Magazine, Apr. 1990, pp. 18–23.
Iwata et al, "Fuzzy Control Using Neural Network Techniques".
International Workshop on Fuzzy System Applications; Hideyuki Takagi and Isao Hayashi; Aug. 1988; "Artificial Neural Network Driven Fuzzy Reasoning".
International Workshop on Fuzzy System Applications; Tatsumi Furuya, Akio Kokubu, and Takeshi Sakamoto; Aug. 1988; "NFS: Neuro Fuzzy Inference System".

*Primary Examiner*—David D. Knepper
*Assistant Examiner*—George Davis
*Attorney, Agent, or Firm*—Oblon, Spivak, McClelland, Maier & Neustadt

[57] ABSTRACT

A multi-layered type neural network for a fuzzy reasoning in which an if-part of a fuzzy rule is expressed by a membership function and a then-part of the fuzzy rule is expressed by a linear expression, the network comprising an if-part neural network for receiving if-part variables of all the fuzzy rules and calculating if-part membership values of all the fuzzy rules, an intermediate neural network for calculating, as a truth value of the premise of each fuzzy rule, a product of the if-part membership values for all the if-part variables, and a then-part neural network for calculating a first sum of the truth values of the premise of all the fuzzy rules, a second sum of a product of the truth values of the premise of all the fuzzy rules and then-part outputs of all the fuzzy rules, and dividing the second sum by the first sum to obtain a quotient as an inferential result.

15 Claims, 8 Drawing Sheets

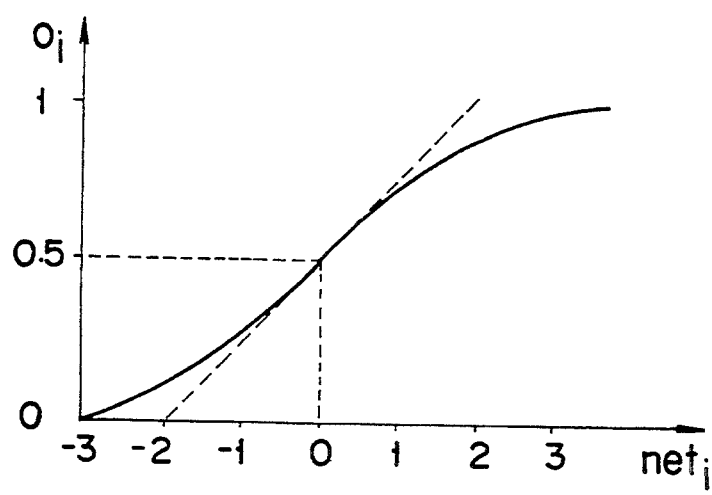
F I G. 2
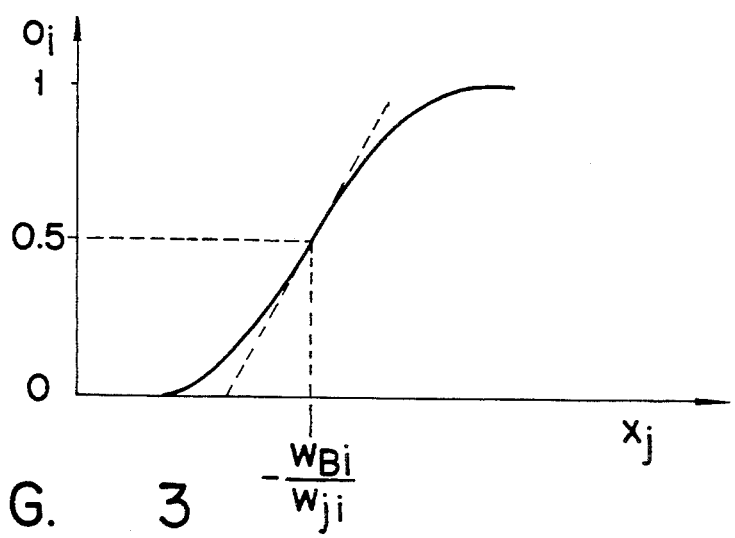
F I G. 3
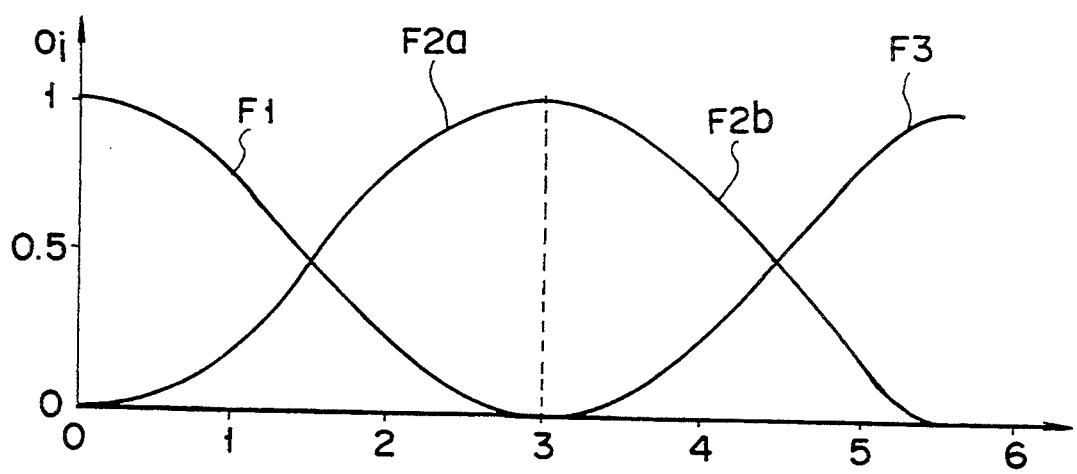
F I G. 4

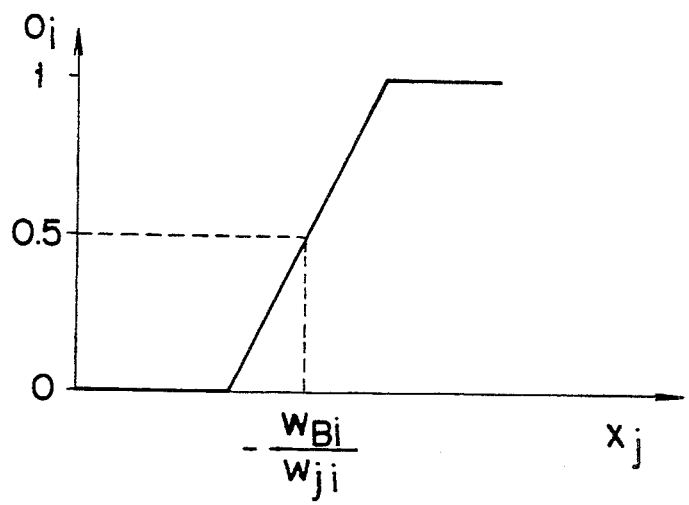
F I G. 5
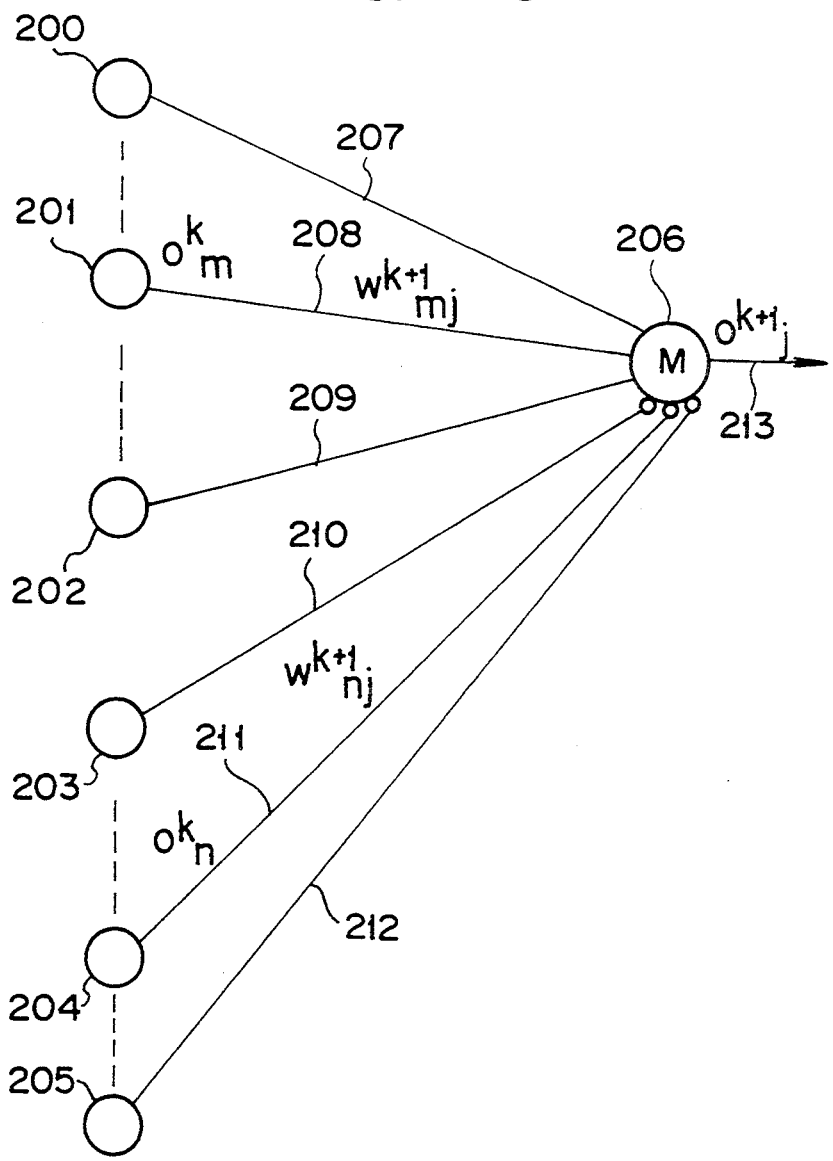
F I G. 6

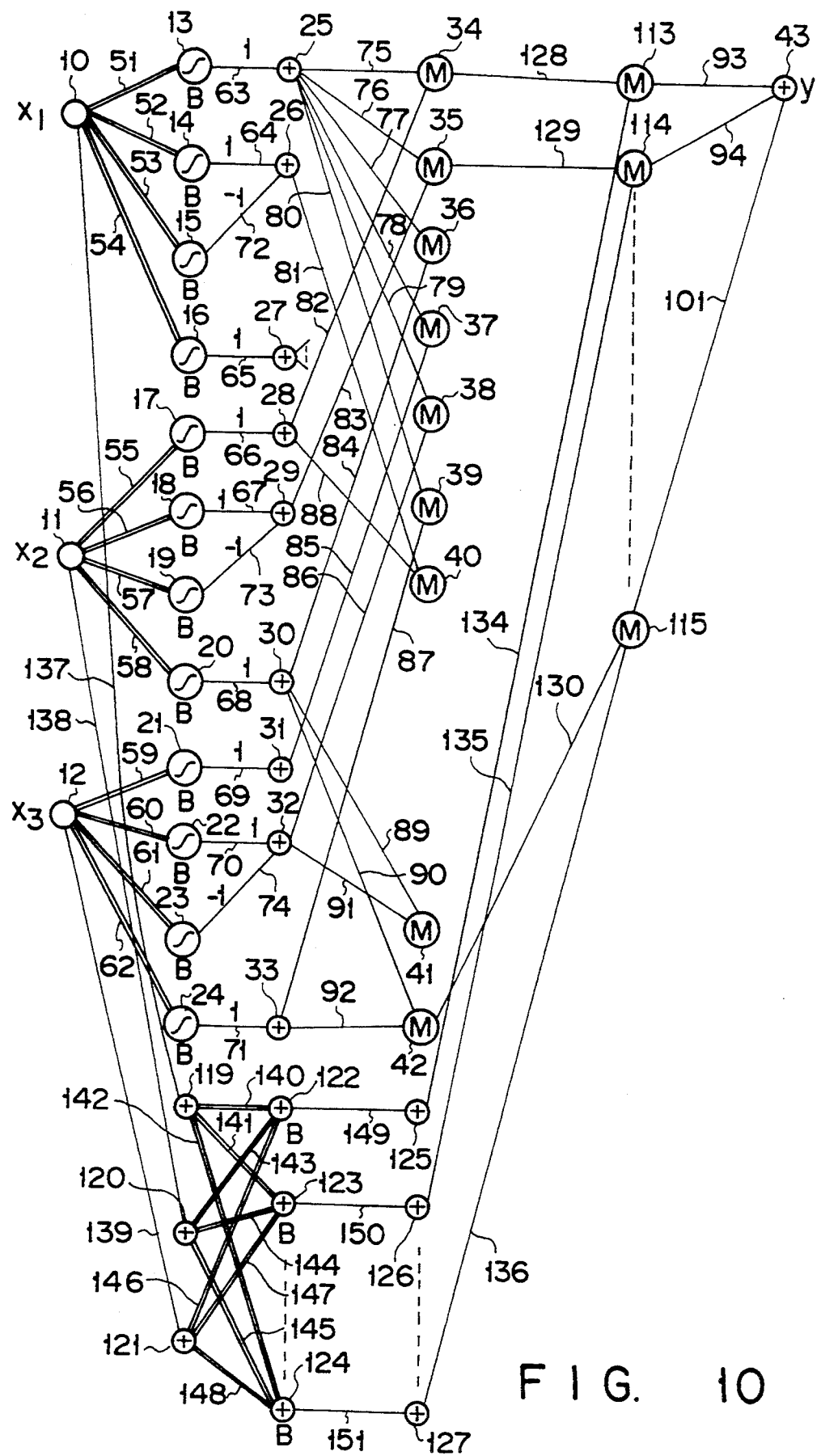
F I G. 10

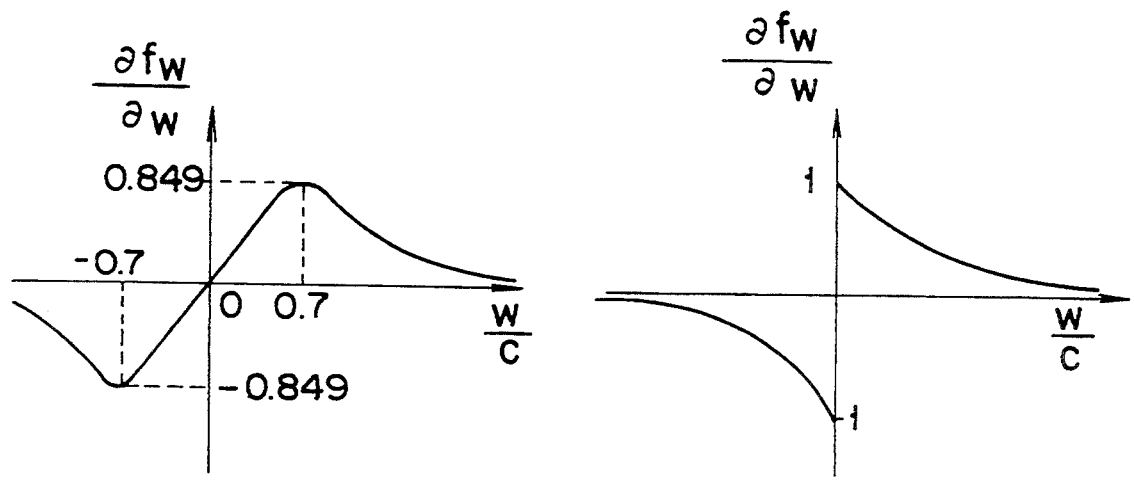
F I G. 11A   F I G. 11B
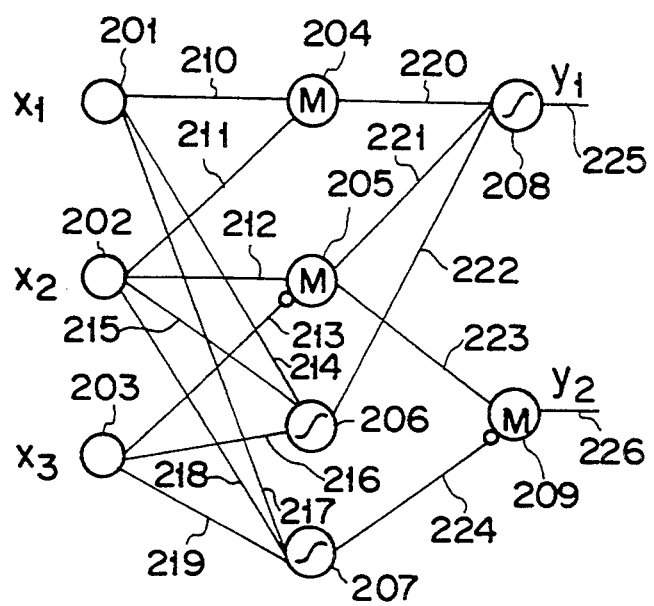
F I G. 12

NEURAL NETWORK FOR FUZZY REASONING

This application is a continuation of application Ser. No. 07/780,335, filed on Oct. 22, 1991, now abandoned.

BACKGROUND OF THE INVENTION

1. Field of the Invention

The present invention relates to a neural network for fuzzy reasoning, and more particularly to a multi-layered neural network which is trained based on a back-propagation algorithm.

2. Description of the Related Art

In a conventional multi-layered neural network, a weight of connection between neurons can be determined to decrease the error of the neural network based on a back-propagation algorithm by supplying the relation between the input and output data as a training data to the network. A nonlinear input/output relationship can be easily and precisely implemented by the multi-layered neural network. The conventional multi-layered neural network has merits of easy training, easy implementation of nonlinear input/output relationship, and precise workability. On the other hand, the conventional multi-layered neural network has the following technical problems.

(1) It is difficult for the operator to fully understand the internal expression of the neural network which is determined by means of training, and thus, the internal expression of the neural network cannot be effectively used as knowledge.

(2) Based on the same reason as in the first problem, it is difficult to initially provide the neural network with human knowledge to set up schematic input/output relationship. Therefore, the neural network system cannot start training from the initial state representing roughly determined by the operator in order to shorten the training period.

(3) Based on the same reason as in the first problem, in the event that a partial variation of the input/output relationship or modification of this relationship is needed, it is not possible to use the human knowledge to change the trained internal expression of the neural network.

Recently, a system for expressing the input/output relationship based on a fuzzy theory is proposed. That is, the proposed fuzzy system expresses human knowledge based on "if-then" rule. Unlike those strict numerical models, since the proposed fuzzy system expresses a variable with a membership function like "small" or "big", it can easily express human knowledge, and thus, usefulness of the system is highly evaluated. Nevertheless, a fuzzy theory involves difficulty to properly determine the membership function and establish fuzzy rules, and as a result, the membership function and the fuzzy rules are determined using a trial and error method.

In the light of the background mentioned above, it is desired to provide an improved neural network which is capable of effectively combining the capability to correctly express human knowledge according to a fuzzy theory and the training potential of the neural network itself. As a result of extensive study according to this object, some of practical methods have been introduced, which are described in the following documents.

(1) Tatsumi FURUYA et al., "NFS: Fuzzy Inference System using a Neural Network", the transactions of the institute of information processing engineers of Japan, Vol. 30, No. 6, June 1989, pages 795 to 798. The proposed fuzzy inference system incorporates an if-part section and a then-part section which are respectively formed of neural networks, and outputs from both sections are combined with each other with a minimum operator. In place of using the membership function, in this system, the input and output are divided into a certain number of domains. Therefore, although being free from restrictive factors of the membership function, the proposed system cannot clearly express the knowledge of the input and output being "big" or "small". Furthermore, the fuzzy inference system is divided into plural networks for the if-part and then-part sections and training is performed for each section. It is difficult to set the input and output data properly for each section. In order to properly determine the input and output data for each section, the operator is obliged to perform a trial and error method.

In summary, the proposed fuzzy inference system contains following technical problems to be solved.
(a) It is desired that the neural network clearly expresses human knowledge.
(b) It is desired to form the fuzzy inference system with a single network and simultaneously train the if-part section and the then-part section.

(2) Isao HAYASHI et al., "Formulation of Fuzzy Reasoning by Neural Network", transactions of 4th fuzzy system symposium (Tokyo, May 30–31, 1988). Unlike the fuzzy inference system described in the first document, this proposed fuzzy inference system directly uses the input and output data without dividing them into a certain number of domains. In this system, the neural networks are provided for the if-part then-part sections of each rule. Therefore, a total number of (double the number of rules) neural networks are provided, where the neural networks respectively output data based on a plurality of rules. Owing to the provision of the if-part and then-part neural networks, this system can express complex input/output relationship. On the other hand, this system cannot clearly express the internal knowledge of the neural network. The expression of knowledge by a three dimensional data, e.g. $x_1$, $x_2$, and $x_3$ makes it difficult to use a rule-knowledge owned by human being which is an object of a fuzzy theory or to extract rules from the neural networks. Furthermore, it is complex to suitably set up the plural neural networks. As described above, the decision made by the neural network is not fully generalized, and contain large errors against evaluation data.

As described above, the conventional neuro-fuzzy system has drawbacks that the knowledge cannot be clearly expressed by a neural network, the structure of the system is complicated and the if-part and the then-part cannot be trained simultaneously since the if-part and then-part are formed of respective neural networks, and the generalization is insufficient.

SUMMARY OF THE INVENTION

Accordingly, it is an object of the present invention to provide a neural network system which can clearly express the knowledge and be easily trained from an initial states which is set by the operator using the human knowledge.

Another object of the present invention to provide a simple neural network system for fuzzy reasoning in which the if-part and then-part are formed of the same single neural network and then the if-part and the then-part can be trained simultaneously.

Further object of the present invention to provide a neural network system which can be sufficiently generalized.

According to one aspect of the present invention, there is provided a neural network system comprising a multi-layered type neural network formed of neurons, a neuron in a layer connected to only a given neuron in a succeeding to the layer with a given weight of connection, the neurons including a first neuron having a multiplication/division function; and means for causing said neural network to perform training to decrease an error such that a weight of connection between only a predetermine part of neurons is changed and a weight of connection between the rest of neurons is not changed.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 illustrates a sigmoid function of the neuron included in the neural network of FIG. 1;

FIG. 3 illustrates an output of the sigmoid function type neuron;

FIG. 4 illustrates an if-part membership function;

FIG. 5 illustrates a function;

FIG. 6 is a schematic diagram of a neuron having a multiplication/division function;

FIG. 10 is a schematic diagram of a fourth embodiment of the neural network according to the present invention;

FIGS. 11A and 11B illustrate a function for determining a redundancy of the fuzzy rule; and FIG. 12 is a schematic diagram of a fifth embodiment of the neural network according to the present invention.

DETAILED DESCRIPTION OF THE PREFERRED EMBODIMENTS

A preferred embodiment of a neural network for fuzzy reasoning according to the present invention will now be described with reference to the accompanying drawings. The present invention utilizes a multi-layered type neural network which is formed of neurons connected in a multi-layered form and has the following features.

(1) Connection between neurons is restricted. Each neuron in a layer is not connected to all the neurons in a preceding layer. Only the necessary neurons are connected to each other.

(2) A weight of connection which can be changed by means of training is also restricted. Only the weight of a selected connection is variable and that of the remaining is fixed to the initial value in spite of training.

(3) The neurons have a variety of characteristics. Unlike the conventional neural network using only sigmoid type neuron, the neurons according to the present invention can execute a linear addition and a multiplication/division.

(4) The neural network is clearly divided into the if-part and then-part sections due to the features of (1) and (2). Unlike the conventional neural network, all the data output from each neuron in the neural network of the present invention clearly express explicit meanings.

(5) As a result of training, the if-part and then-part sections of a neural network can be simultaneously trained.

Figure 1:
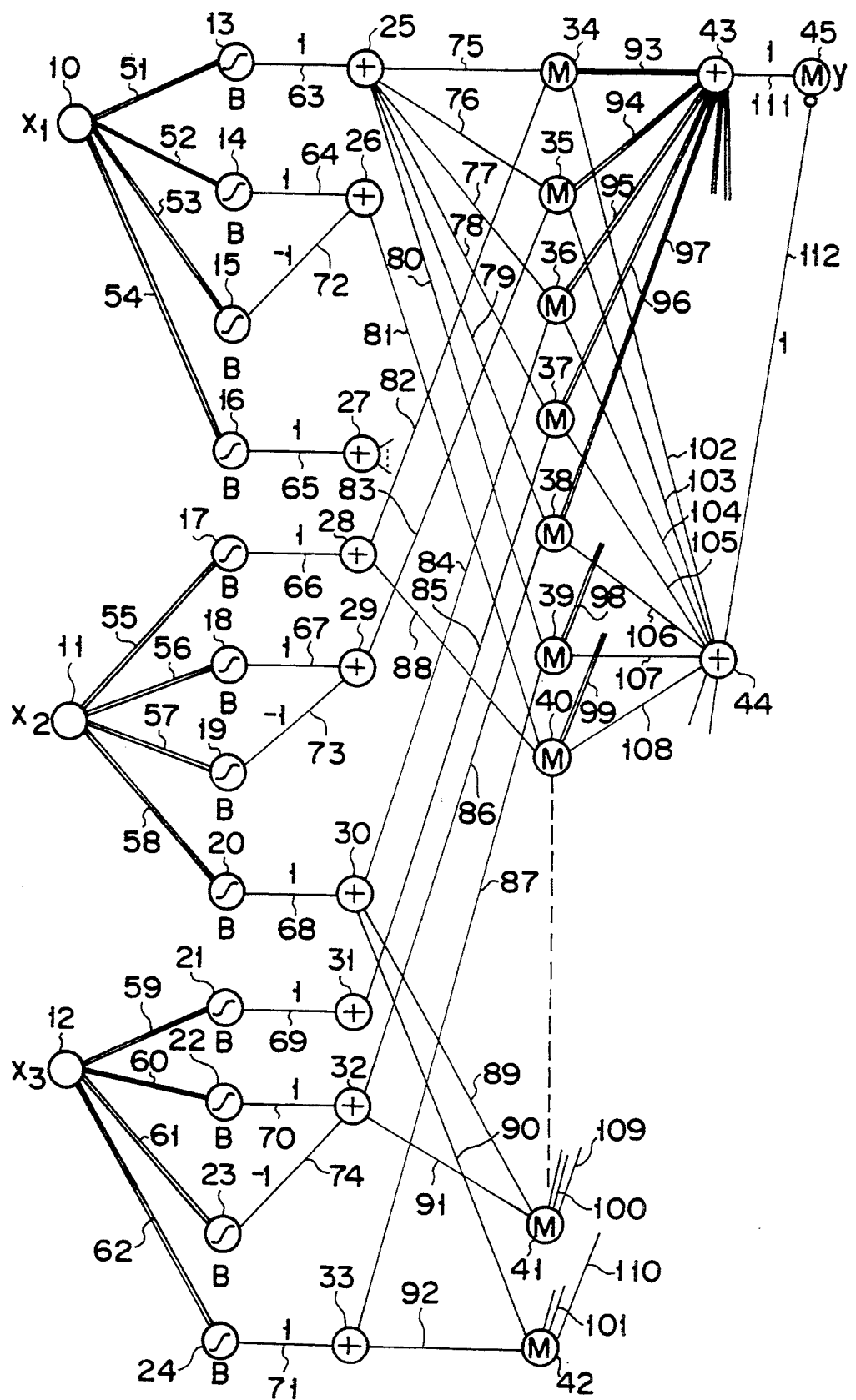
FIG. 1 is a schematic diagram of a first embodiment of the neural network according to the present invention.

Hereinafter, a first embodiment of the neural network for fuzzy reasoning will be described. FIG. 1 shows a schematic representation of the neural network. The neural network shown in FIG. 1 generates an output data y based on three input data $x_1$, $x_2$, and $x_3$.

A fuzzy control rule R is expresses as follows:

$$R_i: \text{ if } \quad x_1 \text{ is } A_{1i}, \ldots, \text{ and} \quad (1)$$
$$x_2 \text{ is } A_{2i}, \ldots, \text{ and}$$
$$\vdots$$
$$x_m \text{ is } A_{mi}, \ldots,$$
$$\text{then } y \text{ is } B_i$$

where $R_i$ ($i=1, 2, \ldots n$) is an i-th fuzzy control rule, $x_j$ ($j=1, 2, \ldots m$) is a j-th input data (or if-part variable), $y_i$ is an output data of the i-th fuzzy control rule $R_i$ (or then-part variable). In this embodiment, for the sake of simplicity, the neural network receives a plurality of input data and generates a single output data. If a plurality of output are generated, outputs data is denoted by $y_{1i}$, $y_{2i}$, etc. $A_{li}$ to $A_{mi}$ are fuzzy parameters like a membership function of "small", "medium", and "big", for example. $B_i$ is also a fuzzy parameter. However, this embodiment is called a simple type and $B_i$ is expressed as constant as follows:

$$y_i = B_i \quad (2)$$

In the simple type, the method for reasoning an output data y based on a number of fuzzy rules $R_1$ to $R_n$ in response to the input data $x_l$ to $x_m$ is shown below.

$$y = \sum_{i=1}^{n} (\omega_i \cdot y_i) / \sum_{i=1}^{n} \omega_i \quad (3)$$

$$\omega_i = \prod_{j=i}^{m} A_{ji}(x_j) \quad (4)$$

where $A_{ji}(x_j)$ is a membership value of the fuzzy parameter $A_{ji}$ for the input data $x_j$, $\omega_i$ is a truth value of the premise of the i-th rule $R_i$ with respect to the input $x_l$ to $x_m$ and is represented as a product of the membership values in accordance with equation (4). Stated another way, the expression "and" in the if-part of the fuzzy rule is conventionally implemented by a minimum operator. However, the minimum operation is not optimal in the case of a process control including a local nonlinearity for the view point of stable of control and convergence of the training. Therefore, in the present embodiment, the expression "and" in the if-part is implemented by a multiplication operator.

As seen from equation (3), the output data y is calculated by dividing a sum of the product of the truth value of the premise $\omega$ of the rule and the then-part variable y by the sum of the truth value of the premise $\omega$ of the rule. That is, equation (3) obtains the center of gravity of the outputs from the n number of rules.

Equation (1) fully used the m number of input data. However, since the simpler the rule, the broader the generality, use of a simple rule is preferred. Based on this relationship, it is preferred that the present embodiment uses a lesser number of input data as much as possible. The present embodiment shown in FIG. 1 uses two conditions, in other words, if-part of the rule includes a combination of two input variables using the "and" expression. It is possible to include only one variable in the if-part of the rule. In these cases, the expression "and" is not included, therefore, it is not necessary to calculate all the input data j in equations (3) and (4). Similarly, it is not necessary to calculate all the rules i in equation (3). As described above, equations (3) and (4) are not always calculated for all the parameters i (=1 to n) and j (=1 to m).

Neurons 13 to 24 in the second layer are a sigmoid type neurons and have a bias B. The neurons 13 to 24 are connected to only a specific neuron in the first layer. For example, the neurons 13 to 16 are connected to a neuron 10 in the first layer. The output of the i-th neuron in the second layer is expressed as follows:

$$net_i = w_{ji} \cdot x_j + w_{Bi} \cdot 1 \quad (5)$$
$$= w_{ji}(x_j + (w_{Bi}/w_{ji}))$$

$$O_i = 1/(1 + e^{-net_i}) \quad (6)$$

where $w_{ji}$ is the weight of connection between the input data $x_j$ and the i-th neuron in the second layer, $w_{Bi}$ is the bias of the i-th neuron in the second layer. The bias can be regarded as the weight of connection between the input data having a value of 1 and the i-th neuron in the second layer, as seen from equation (5). Therefore, the bias can be changed by means of training of the neural network in the same manner as in the normal weight of connection. Further, it is also possible to regard the bias as the weight of connection between the input data having an arbitral value and the neuron. The "$net_i$" represents the internal state of the i-th neuron in the second layer and is an input of the sigmoid function.

Equation (6) is called a sigmoid function which monotonously increased between 0 and 1 and has a gradient of 0.5 and a center of 0, as shown in FIG. 2.

FIG. 3 graphically represents the result of substitution of equation (5) to equation (6). This function represents a monotone increasing function of the gradient value of 0.25 and the center $-(w_{Bi}/w_{ji})$.

FIG. 4 illustrates membership functions having a shape of a temple bell. The curves F1 and F3 represent membership functions of "small" and "big". These curves F1 and F3 are directly obtained from equations (5) and (6). A membership function of "medium" is formed of two parts F2a and F2b, therefore, obtained by calculating the difference between two membership functions F1 and F3. The neurons 25 to 33 in the third layer calculate the if-part membership function. The neurons 26, 29, and 32 calculate the if-part membership function of "medium" and thus connected to the two neurons 14, 15; 18, 19; and 22, 23 in the second layer with weights of connection of values 1 and $-1$, respectively. The neurons in the third layer are not sigmoid type neurons but are linear addition type neurons which output the internal state as it is.

Each neuron in the second layer has a single output. One or two outputs of the neurons in the second layer are connected to a neuron in the third layer. The weights of connections 63 to 71 are fixed to a value 1 and those of connections 72 to 74 are fixed to a value $-1$. As described, the neural network of the present embodiment includes the fixed weights of connection which cannot be changed even if training is performed. It is one of the features of the present invention that the connection between the neurons is restricted.

The output from the third layer neurons represents the if-part membership value $A_{ji}(x_j)$ of the fuzzy parameter $A_{ji}$ with respect to the input $x_j$. The outputs of the neurons 25 to 33 in the third layer respectively represent the membership function values $S(x_1)$, $M(x_1)$, $B(x_1)$, $S(x_2)$, $M(x_2)$, $B(x_2)$, $S(x_3)$, $M(x_3)$, and $B(x_3)$. S, M, and B are the membership functions of "small", "medium", and "big".

The outputs from the neurons 34 to 42 in the fourth layer represent the truth value of the premise of the i-th rule denoted by equation (4). Since the fuzzy rule of the present embodiment includes two conditions and the "and" expression of the if-part is implemented by the multiplication operator, the neurons in the fourth layer calculate the product in accordance with equation (4) and outputs the product. Stated another way, the neurons 34 to 42 have a multiplication/division function and only perform the multiplication operation in this case.

The outputs $\omega_1$, $\omega_2$, $\omega_3$, $\omega_4$, ... of the neurons 34, 35, 36, 37, ... are represented as follows:

$$\omega_1 = S(x_1) \cdot S(x_2)$$
$$\omega_2 = S(x_1) \cdot M(x_2)$$
$$\omega_3 = S(x_1) \cdot B(x_2)$$
$$\omega_4 = S(x_1) \cdot S(x_3)$$
$$\vdots$$

The weights of connections 75 to 92 between the neurons in the third layer and the neurons in the fourth layer are fixed to a value 1 and the connections therebetween are restricted.

As described above, the neurons of the first to fourth layers execute calculations of the if-part of the fuzzy rule.

Neurons 43 and 44 in the fifth layer and a neuron 45 in a sixth layer calculate the then-part of the fuzzy rule according to equations (3) and (2). The neuron 43 is connected to the neurons 34 to 42 in the fourth layer with connections 93 to 101. The weights of the connections 93 to 101 are a variable value $B_i$ and are determined by means of training. The neurons 43 and 44 are linear addition type neurons. The neuron 43 calculates the numerator of equation (3). Similarly, the neuron 44 is connected to the neurons 34 to 42 in the fourth layer with connections 102 to 110. The weights of the connections 102 to 110 are fixed to a value 1. The neuron 44 calculates the sum of the truth values of the premise of all the rules, i.e. the denominator of equation (3).

The neurons 45 in the sixth layer has a multiplication/division function and calculates the division in which the output from the neuron 43 is a dividend and the output from the neuron 44 is a divisor. The weights of a connection 111 between neurons 43 and 45 and a connection 112 between neurons 44 and 45 are fixed to a value 1. In the embodiment of FIG. 1, a neuron marked with "M" represents a multiplication/division type neuron and a neuron marked with "+" is a linear addition type neuron. With respect to the neuron "M", the mark "o" represents the divisor. The output of the sixth layer neuron 45 represents a result of calculation according to equation (3).

As mentioned above, the present embodiment fully implements fuzzy reasoning by means of the neural network in which each neuron is assigned to calculate each part of the fuzzy reasoning. That is, all the outputs from the neurons and the weights of connection exhibit clear meanings. The connections of neurons only regarding to the following two portions can be changed but the remaining connections cannot be changed so that the connection of neurons is restricted.

(1) The weights of connection between the neurons in the first and second layers and the bias of the neurons in the second layer.

(2) A part of the weights of connection between the neurons in the fourth and fifth layers.

Suitable values for these variable weights of connection are determined by means of training as described later. Alternately, they can be initially set based on human knowledge. This is because the meanings of the weights of connection are clearly combined with the fuzzy rule. Similarly, a part of connections between neurons can be easily changed when the fuzzy rule is to be partially changed.

The remaining connections have fixed weights. Each neuron in a layer is not connected to all the neurons in the adjacent layers but is connected to only the necessary neurons according to the fuzzy rules. Furthermore, not only the conventional sigmoid type neurons, but the neural network of the present embodiment incorporates the linear addition type neurons and the multiplication/division type neurons.

The neurons in the second layer can be replaced by a neuron of a linear addition type with a limit characteristic as shown in FIG. 5. In this case, the membership function has a triangular or trapezoidal shape.

Next, the functional operation of the neural network of the present embodiment will be described below. Since the neural network of the present embodiment directly implements the knowledge as shown in equation (1), there are two possibilities described below:

(1) A case in which the membership function is known and the connection of the neurons and the weight of connection can be determined by the operator based on the fuzzy rule; and (2) A case in which at least one of the if-part and then part is unknown and the connection of the neurons and the weight of connection must be determined by means of training.

For the case (1), the weight of connection can be determined as described above. With respect to the if-part, the description is given with reference to FIG. 4. Here, it is assumed that the input data is limited to a range between 0 to 6. The membership function F1 has a gradient of $-0.5$ and a center of 1.5. The membership function F2a has a gradient of $+0.5$ and a center of 1.5. The membership function F2b has a gradient of $-0.5$ and a center of 4.5. The membership function F3 has a gradient of $+0.5$ and a center of 4.5. The following weights of connection are obtained from the relationship shown in FIG. 3.

$$0.25 \times w_{11} = -0.5$$
$$\therefore w_{11} = -2$$
$$-w_{B1}/w_{11} = 1.5$$
$$\therefore w_{B1} = 3$$

Similarly, the following weights of connection are obtained.

$w_{12} = +2$
$w_{B2} = -3$
$w_{13} = -2$
$W_{B3} = 9$
$W_{14} = +2$
$W_{B4} = -9$

The weights $w_{11}$, $w_{12}$, $w_{13}$, and $w_{14}$ of connections 51, 52, 53, and 54 are respectively $-2$, $+2$, $-2$, and $+2$.

The biases $w_{B1}$, $w_{B2}$, $w_{B3}$, and $w_{B4}$ of the neurons 13, 14, 15, and 16 are respectively 3, $-3$, 9, and $-9$. The other weights with respect to the inputs x2 and x3 are similarly obtained.

The weights of connections 93 to 101 between the fourth and fifth layers are $B_i$ itself as represented by equations (1) and (2), so that the value $B_i$ is set to these weights. As described above, all the weights of connection are determined.

For the case (2), the initial values are set to the weights of connection in the if-part according to the range into which the input data is classified, e.g. "small", "medium", or "big", in the same manner as in the case (1). FIG. 4 denotes the input ranging from 0 to 6 is classified into three ranges "small", "medium", and "big". These initial values are changed to a suitable value by means of training.

The initial values of the weights of connections 93 to 101 of the then-part are set to a random number smaller than the desired output. For example, the random number between 0 and 0.1 are set to the initial value when the output data is between 0 and 1.

Here, all the initial values are set as the weights of connection.

Then, the training data denoting the input/output relationship is supplied to the neural network. The output of the neural network is calculated when the training data is input. The calculation of the outputs of the neuron are sequentially performed in the order from the input layer to the output layer. The training algorithm is represented as follows:

$$net^k_j = \sum_i w^k_{ij} \cdot O^{k-1}_i \qquad (7)$$

(for the neurons other than the multiplication/division type)

$$net^k_j = \pi_{m,n} (w^k_{mj} \cdot O^{k-1}_m / w^k_{nj} \cdot O^{k-1}_n) \qquad (8)$$

(for the multiplication/division type neuron) where $m \neq n$ $$O^k_j = f(net^k_j) \qquad (9)$$
$$= 1/(1 + e^{-net^k_j}) \qquad (10)$$

(for the sigmoid type neuron)
$$O^k_j = net^k_j \qquad (11)$$

(for the multiplication/division type neuron and linear addition type neuron)
where "$net^k_j$" represents the internal state of the j-th neuron in the k-th layer and $w^k_{ij}$ represents the weight of connection between the i-th neuron in the (k−1)-th layer and the i-th neuron in the k-th layer. For the calculation of the bias, the output of the i-th neuron in the (k−1)-th layer is regarded as constant.

Further, $O^k_i$ is the output from the i-th neuron in the k-th layer and has a value of function $f(net^k_j)$. Equation (10) denotes the sigmoid function. In the multiplication/division type neuron or linear addition type neuron, the netkj is output as it is in accordance with equation (11). Though not shown by equation, it is to be noted that the limit characteristic is required in the case of FIG. 5.

When a given neuron is connected to a neuron in the preceding layer, the given neuron calculates the sum of the product of the output $O^{k-1}_j$ and weights $w^k_{ij}$ in accordance with equation (7).

For the multiplication/division type neuron, when a given neuron is connected to a neuron in the preceding layer, the given neuron calculates the product of the output $O^{k-1}_m$ and weights $w^k_{mj}$ in accordance with equation (8) except for the case when it is a divisor. The neuron being the divisor calculates the denominator of equation (8). If the divisor is not required, the denominator is 1. The constant m is never equal to the constant n. The neuron in the input layer outputs the input data as it is. The output of the neural network is thus calculated according to equations (7) to (11).

Then, training is performed by using the output data thus calculated and the training data. The method of training is based on the back-propagation algorithm described in "PDP model", Sangyo Tosho, by D. E. Rammelhert et al.. The training algorithm of the present invention differs from the conventional backpropagation algorithm as follows.

(1) The connection between the neurons is restricted and the error of the calculated output and the training data is transmitted in a backward direction through only the connections provided in the network.

(2) Only predetermined weights of connection can be changed by means of training.

(3) Since the conventional back-propagation algorithm does not involves the multiplication/division type neuron, the weight of connection with respect to the multiplication/division type neuron is calculated as follows.

$$\Delta w^k_{ij} = \eta \cdot \delta^k_j \cdot O^{k-1}_i + \alpha \cdot \Delta w^{*k}_{ij} \qquad (12)$$

where $\eta$ is a training coefficient, $\alpha$ is an inertia coefficient, and $\Delta w^{*k}_{ij}$ is an inertia term for speeding up the convergence and is a value of $\Delta w^k_{ij}$ at previous calculation time. $\delta^k_j$ is defined as follows.

$$\delta^k_j = -(\partial E/\partial net^k_j) \qquad (12a)$$

where E is a square error between the neuron output and the training data. The $\delta^k_j$ of a neuron in the output layer is given as follows.

$$\delta^k_j = (t_j - O^k_j) f'(net^k_j) \qquad (13)$$

where k represents the output layer. The $\delta^k_j$ of a neuron in a layer other than the output layer and connected to a neuron in the succeeding (k+1)-th layer other than the multiplication/division type neuron is calculated as follows.

$$\delta^k_j = f'(net^k_j) \sum_e \delta^{k+1}_e \cdot w^{k+1}_{je} \qquad (14)$$

The $\delta^k_j$ of a neuron in a layer other than the output layer and connected to the multiplication/division type neuron in the succeeding layer is calculated as follows.

$$\delta^k_j = f'(net^k_j) \sum_e \delta^{k+1}_e \cdot (\partial net^{k+1}_e/\partial O^k_j) \qquad (15)$$

Since equations (13) and (14) are described in a many documents and are well known, the description thereof is omitted. The description of equation (15) will be followed.

FIG. 6 schematically illustrates an example of the connection between the multiplication/division type neuron in the (k+1)-th layer and the normal neurons in the k-th layer. The inputs to the multiplication/division type neuron marked with "o" represent a divisor. FIG. 6 is equivalent to equation (8) in which the parameters k and k−1 are respectively replaced by k+1 and k. The constants m and n shown in FIG. 6 are the representatives of the connections of the dividends and divisors. When the divisor is not necessary, equation (8) is rewritten to as being of only the numerator. The $\delta^k_j$ is calculated as follows for the neurons other than the neurons in the output layer.

$$\begin{aligned}\delta^k_j &= -(\partial E/\partial net^k_j) \\ &= -(\partial E/\partial O^k_j) \cdot (\partial O^k_j/\partial net^k_j) \\ &= -(\partial O^k_j/\partial net^k_j) \sum_e (\partial E/\partial net^{k+1}_e) \cdot \\ &\quad (\partial net^{k+1}_e/\partial O^k_j)\end{aligned} \qquad (17)$$

If the parameters k and k−1 in equations (8) and (11) are replaced by k+1 and k, a partial differential of equation (8) is obtained as follows.

$$\partial net^{k+1}{}_e/\partial O^k{}_j = (1/O^k{}_j) \cdot \pi_{m,n} (O^k{}_m \cdot w^{k+1}{}_{mj}/O^k{}_n \cdot w^{k+1}{}_{nj}) \quad (18)$$
$$= O^{k+1}{}_e/O^k{}_j$$

where the j-th neuron in the k-th layer is not the divisor of the neuron l in the (k+1)-th layer.

$$\partial net^{k+1}{}_e/\partial O^k{}_j = -(1/O^k{}_j) \cdot \pi_{m,n} (O^k{}_m \cdot w^{k+1}{}_{mj}/O^k{}_n \cdot w^{k+1}{}_{nj}) \quad (19)$$
$$= -O^{k+1}{}_e/O^k{}_j$$

where the j-th neuron in the k-th layer is the divisor of the neuron Z in the (k+1)-th layer.

Therefore, one of equations (18) and (19) is substituted into equation (15) according to the above condition.

Since all the $\delta^k{}_j$ are obtained, it is possible to train the network based on the back-propagation algorithm even when the multiplication/division type neurons are included.

Referring now to FIG. 1, the details of training will be described.

It is assumed that all the output data including data $O^6{}_1$ output from the sixth layer are calculated for the supplied input data and the training data $t_1$ is given. The $\delta^k{}_j$ are calculated in the order from the output layer to the input layer.

For the neuron 45 in the output layer, the $\delta^k{}_j$ is obtained by using equation (13) as follows.

$$\delta^6{}_1 = (t_1 - O^6{}_1)$$

For the neuron 43 in the fifth layer, the $\delta^k{}_j$ is obtained by using equations (15) and (18) as follows.

$$\delta^5{}_1 = 1 \cdot \sum_1 \delta^6{}_1 \cdot (O^6{}_1/O^5{}_1)$$
$$= \delta^6{}_1 \cdot (O^6{}_1/O^5{}_1)$$

For the neuron 44 in the fifth layer, the $\delta^k{}_j$ is obtained by using equations (15) and (19) as follows.

$$\delta^5{}_2 = 1 \cdot \sum_1 \delta^6{}_1 \cdot (-O^6{}_1/O^5{}_1)$$
$$= -\delta^6{}_1 \cdot (O^6{}_1/O^5{}_1)$$

For the neuron 34 in the fourth layer, the $\delta^k{}_j$ is obtained by using equation (14) as follows.

$$\delta^4{}_1 = 1 \cdot \sum_{e=1}^{2} \delta^5{}_e \cdot w^5{}_{e1}$$
$$= \delta^5{}_1 \cdot w^5{}_{11} + \delta^5{}_2 \cdot w^5{}_{12}$$

For the neuron 25 in the third layer, the $\delta^k{}_j$ is obtained by using equations (15) and (18) as follows.

$$\delta^3{}_1 = 1 \cdot \sum_{e=1}^{7} \delta^4{}_e \cdot (O^4{}_e/O^3{}_1)$$
$$= \delta^4{}_1 \cdot (O^4{}_1/O^3{}_1) + \delta^4{}_2 \cdot (O^4{}_2/O^3{}_1) + \ldots$$

For the neuron 13 in the second layer, the $\delta^k{}_j$ is obtained by using equation (14) as follows.

$$\delta^2{}_1 = f'(net^2{}_1) \cdot \sum_1 \delta^3{}_1 \cdot w^3{}_{11}$$
$$= (1 - O^2{}_1) \cdot O^2{}_1 \cdot \delta^3{}_1 \cdot w^3{}_{11}$$

This is because that the differential of equation (10) is calculated as follows.

$$f'(net^k{}_j) = (1 - O^k{}_j) \cdot O^k{}_j$$

Since all the $\delta^k{}_j$ are calculated, the weights of connections 93 to 101 between the fourth and fifth layers and connections 51 to 62 between the first and second layers and the biases of the neurons in the second layer are to be calculated in accordance with equation (12).

For example, the weight of connection 93 is calculated as follows.

$$\Delta w^5{}_{11} = \eta \cdot \delta^5{}_1 \cdot O^4{}_1 + \alpha \cdot \Delta w^{*5}{}_{11}$$

The weight and bias of connection 51 are calculated as follows.

$$\Delta w^2{}_{11} = \eta \cdot \delta^2{}_1 \cdot O^1{}_1 + \alpha \cdot \Delta w^{*2}{}_{11}$$
$$= \eta \cdot \delta^2{}_1 \cdot x^1 + \alpha \cdot \Delta w^{*2}{}_{11}$$
$$\Delta w^2{}_{41} = \eta \cdot \delta^2{}_1 \cdot 1 + \alpha \cdot \Delta w^{*2}{}_{41}$$

The $\eta$ is determined based on the desired value for the variation.

During the above training, the if-part membership function and the then-part variable y are determined.

The membership function is initially set as shown in FIG. 4. Therefore, the function F1 is never positioned right of the function F3. This is because that training is converged to a point at which the square error is minimum and thus the positional location of the functions is never changed. However, the gradient and the center of the function are changed to optimal values. Training of the then-part is performed such that y=0.9 for the rule R1 and y=0.12 for the rule R2.

Figure 7:
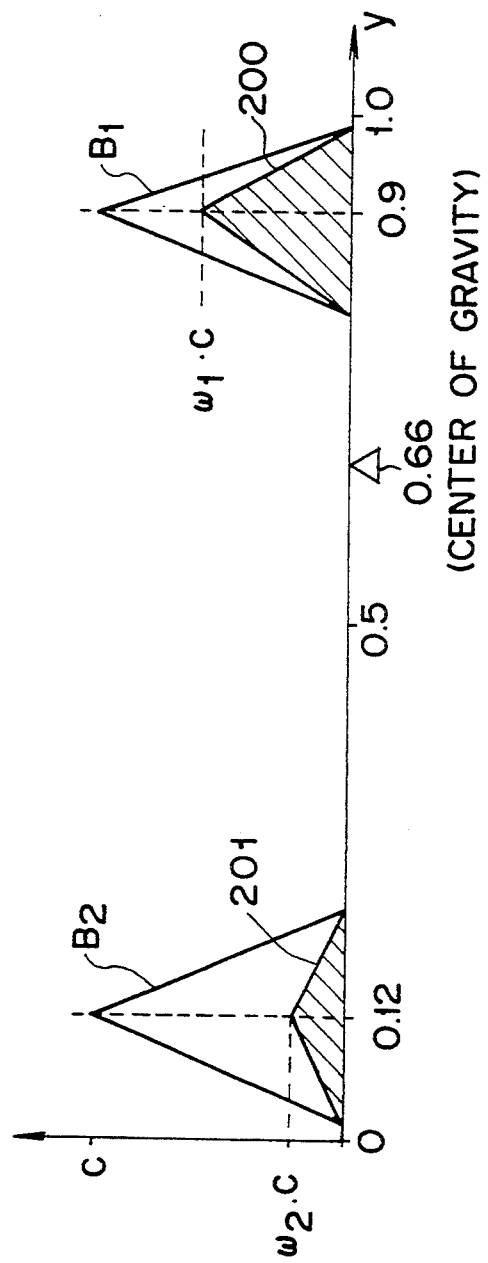
FIG. 7 illustrates calculation of a result of inference.

It is assumed that the then-part variable is within the range of 0 to 1. Therefore, as shown in FIG. 7, the then-part membership function $B_1$ of the rule $R_1$ is regarded as a function with a center of 0.9 and an area of 1 and the then-part membership function $B_2$ of the rule $R_2$ is regarded as a function with a center of 0.12 and an area of 1. The inferential results 200 and 201 for the rules $R_1$ and $R_2$ are obtained by multiplying the membership functions $B_1$ and $B_2$ with the truth value of the premise $\omega_1$ and $\omega_2$ of the rules $R_1$ and $R_2$. The ares of the inferential results 200 and 201 are thus $\omega_1$ and $\omega_2$. If $\omega_1=0.7$ and $\omega_2=0.3$, the center of gravity of the inferential results 200 and 201 becomes 0.66 which is the final inferential result represented by equation (3).

On the other hand, since the then-part variable is limited to a range of 0 to 1, y=0.9 interprets that y is big and y=0.12 interprets that y is small. The membership functions for "big" and "small" can be regarded as the functions shown in FIG. 7 with the center of 0.9 and 0.12.

Thus, it is possible for the present embodiment to obtain a qualitative fuzzy variable which can be easily understood by a human being by means of training and to clearly set the fuzzy variable as the membership function.

If the denominator of equation (3) is constant in every occasion, the same result can be obtained as in the above case even if the center of gravity is not calculated. However, $\omega_1=0.3$ and $\omega_2=0.3$ in the case of FIG. 7, y=0.51 if the center of gravity is calculated but y=0.306 if the center of gravity is not calculated.

In order to prevent the error in the case where the center of gravity is not calculated, it is necessary to determine the if-part of the fuzzy rule so that the denominator of equation (3) is kept constant. However, to make the denominator of equation (3) constant, the number of fuzzy rules is increased and the membership function includes many restrictions. Therefore, one of the features of the present embodiment is that the number of rules can be decreased by means of an interpolation operation resulted from the calculation of the center of gravity.

As described above, the present embodiment has the following advantages.

(1) Unlike the conventional neural network, the function of each neuron is clearly defined so that the knowledge which is extracted from the rule can be easily understood through the training.

(2) It is possible to set the initial values by using the knowledge of a human being. Since only the if-part or both the if-part and then-part can be initially set, the input/output relationship can be determined without training of the neural network. Further, since the if-part and then-part are implemented by a single neural network, the trainings for the if-part and then-part can be simultaneously performed.

(3) Even after completing the whole connection of the neural network, depending on changing the circumferential condition, the connections can be partially changed without performing training.

(4) In the conventional neural network, each neuron in one layer is connected to all the neurons in the adjacent layers and all the weights of connection can be changed through training so that the identification error is sufficiently reduced for the training data but this error is significant for the untrained data. In the present embodiment, since the multiplication/division type neuron is included and the weight of connection and the bias which can be changed through training are restricted, the generalization of the neural network (the output from the neural network in response to the untrained data after training is small) can be efficiently done through training.

(5) Since the center of gravity of the then-part membership function is calculated, the number of the fuzzy rules can be decreased. This, in turn, permits the neural network to decrease the number of neurons. As a result, it is possible to minimize the time needed for executing calculation and to fully generalize the neural network because of the decreased number of fuzzy rules.

Other embodiments of the present invention will be described. Though in the first embodiment, the then-part variable yi is a constant Bi as expressed by equation (2). In the second embodiment, it is possible to define the then-part variable yi in a form of a linear expression as shown by equation (2').

$$y_i = b_{0i} + b_{1i}x_1 + b_{2i}x_2 + \ldots + b_{mi}x_m \quad (2')$$

If the second et seq. terms in equation (2') are omitted, equation (2') is rewritten as equation (2). As is seen from equation (2'), the number of rules can be decreased by making the then-part of the rule complex and increasing the amount of information per rule.

Figure 8:
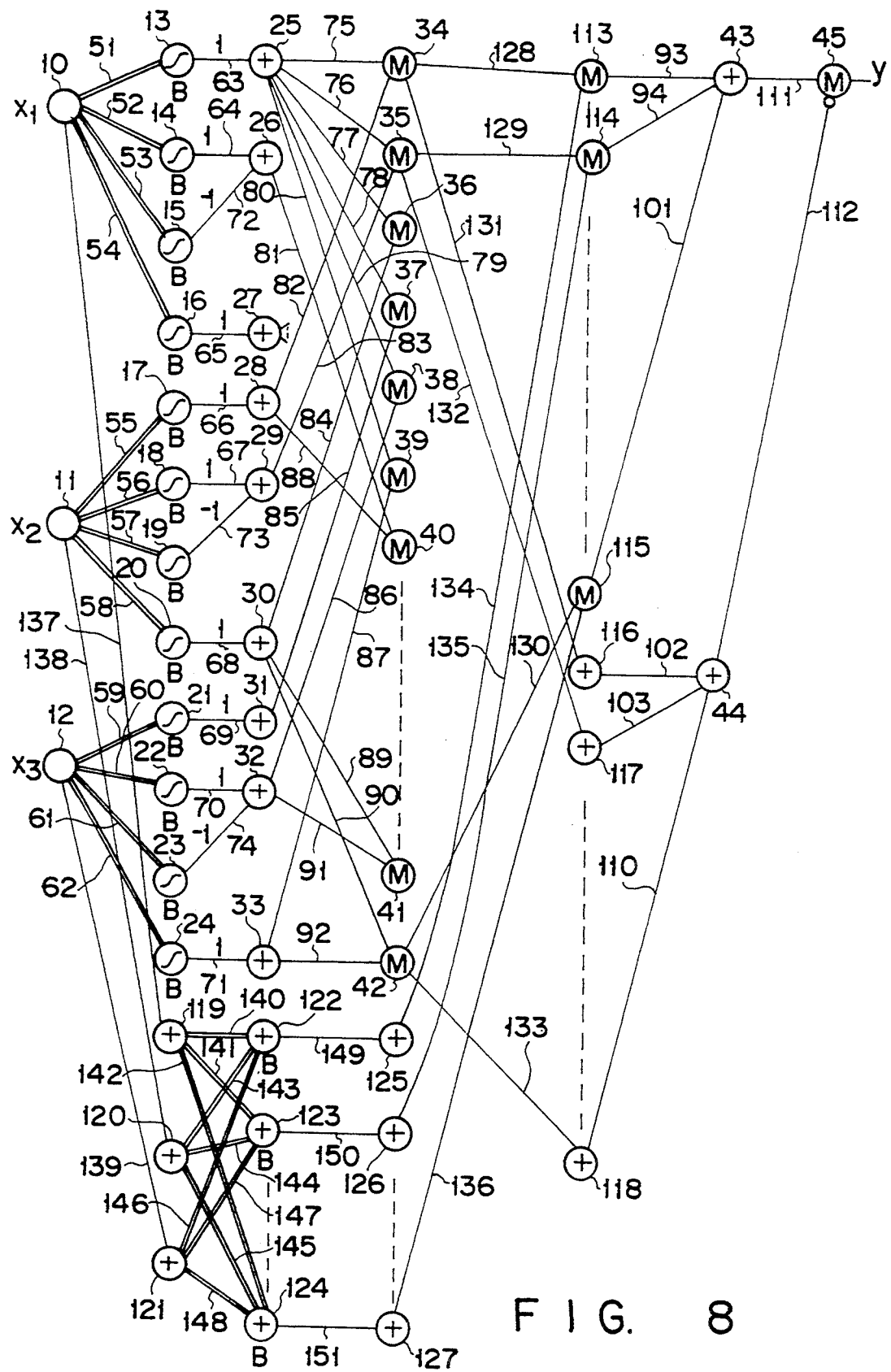
FIG. 8 is a schematic diagram of a second embodiment of the neural network according to the present invention.

FIG. 8 illustrates a second embodiment which is a modification of the first embodiment in which the then-part variable is represented by equation (2'). In FIG. 8, reference numerals other than the connections 93 to 110 are the same as the first embodiment. The difference between the first embodiment and the second embodiment is as follows.

(1) An intermediate layer 4a is newly inserted between the fourth layer and fifth layer. The intermediate layer 4A is formed of multiplication/division type neurons 113 to 115 and linear addition type neurons 116 to 118. The number of neurons 113 to 115 is correspond to the number of the fuzzy rules. The neurons 113 to 115 calculate the product of $\omega_i \cdot y_i$ according to equation (3). In the first embodiment using equation (2), the weight of connections 93 to 101 calculate this product. In the second embodiment, since the linear expression (2') is used, the multiplication is necessary. The neurons 116 to 118 merely output the truth value of the premise of the rule output from the neurons 34 to 42 so that it is possible to omit these neurons 116 to 118.

(2) In order to realize the linear expression (2'), the second layer incorporates the linear addition type neurons 119 to 121, the third layer incorporates the linear addition type neurons 122 to 124 with a bias, and the fourth layer incorporates the linear addition type neurons 125 to 127. The neurons 119 to 121 are correspond to three inputs $x_1$, $x_2$, and $x_3$ and merely transmit the inputs $x_1$, $x_2$, and $x_3$ to the third layer. The number of the neurons 122 to 124 is correspond to the number of the fuzzy rules. The neurons 122 to 124 perform a linear addition and the bias to calculate equation (2'). The neurons 125 to 127 merely transmit the output from the neurons 122 to 124 to the neurons in the intermediate layer 4A. As a result, it is possible to omit the neurons 119 to 121 and 125 to 127 since they merely transmit the input to the succeeding layer.

(3) Following connections are necessary to provide the above new connections. Connections 137 to 139 with a fixed weight of 1 are provided between the input layer and the neurons 119 to 121 in the second layer. Connections 140 to 148 with a variable weight are provided between the neurons 119 to 121 in the second layer and the neurons 122 to 124 in the third layer in accordance with the linear expression. In this embodiment, a linear expression (2') in the case of m=3 is realized. Connections 149 to 151 with a fixed weight of 1 are provided between the neurons 122 to 124 in the third layer and the neurons 125 to 127 in the fourth layer. Connections 128 to 130 with a fixed weight of 1 are provided between the neurons 134 to 142 in the fourth layer and the neurons 113 to 115 in the intermediate layer 4A. These connections 128 to 130 are one of the inputs of the multiplication. Connections 131 to 133 with a fixed weight of 1 are provided between the neurons 134 to 142 in the fourth layer and the neurons 116 to 118 in the intermediate layer 4A. Connections 134 to 136 with a fixed weight of 1 are provided between the neurons 125 to 127 in the fourth layer and the neurons 113 to 115 in the intermediate layer 4A. These connections 134 to 136 are the other of the inputs of the multiplication.

(4) The weight of connections 93 to 101 between the neurons 113 to 115 in the intermediate layer 4A and the fifth layer neuron 43 is changed to a fixed value of 1 since the intermediate layer 4A is added and the linear expression is calculated by means of other connections. The weight of connections 102 to 110 between the neurons 116 to 118 in the intermediate layer 4A and the fifth layer neuron 44 is changed to a fixed value of 1 since the intermediate layer 4A is added.

It is to be noted that the connections 93 to 101 are used for calculating the numerator and the connections 102 to 110 are used for calculating the denominator of equation (4) in the same manner as in the first embodiment.

Connections other than the above connections are the same as the first embodiment. It can be regarded that the connections 51 to 62 and 93 to 101 of the first embodiment are changed to connections 51 to 62 and 140 to 148.

To summarize, the truth value of the premise of the rule is calculated at neurons 34 to 42 and the linear expression of the then-part is calculated at neurons 122 to 124. To calculate the numerator of equation (3), the neurons 113 to 115 respectively calculate the values of each rule and the neuron 43 sums the values of all the rules. The denominator of equation (3) is calculated at the neuron 44. Finally the center of gravity is calculated at the neuron 45.

The calculation and the training of the second embodiment are the same as in the first embodiment except that equation (2) is rewritten to a more general form equation (2'). During training, the equation used for each neuron is determined in accordance with the type of the preceding neuron as in the first embodiment.

As described above, the second embodiment has the same effects as in the first embodiment. Further, the second embodiment can realize the input/output relationship including a nonlinear characteristic with a smaller number of rules and the input/output relationship can be clearly expressed since the then-part is expressed in a form of a linear expression.

Figure 9:
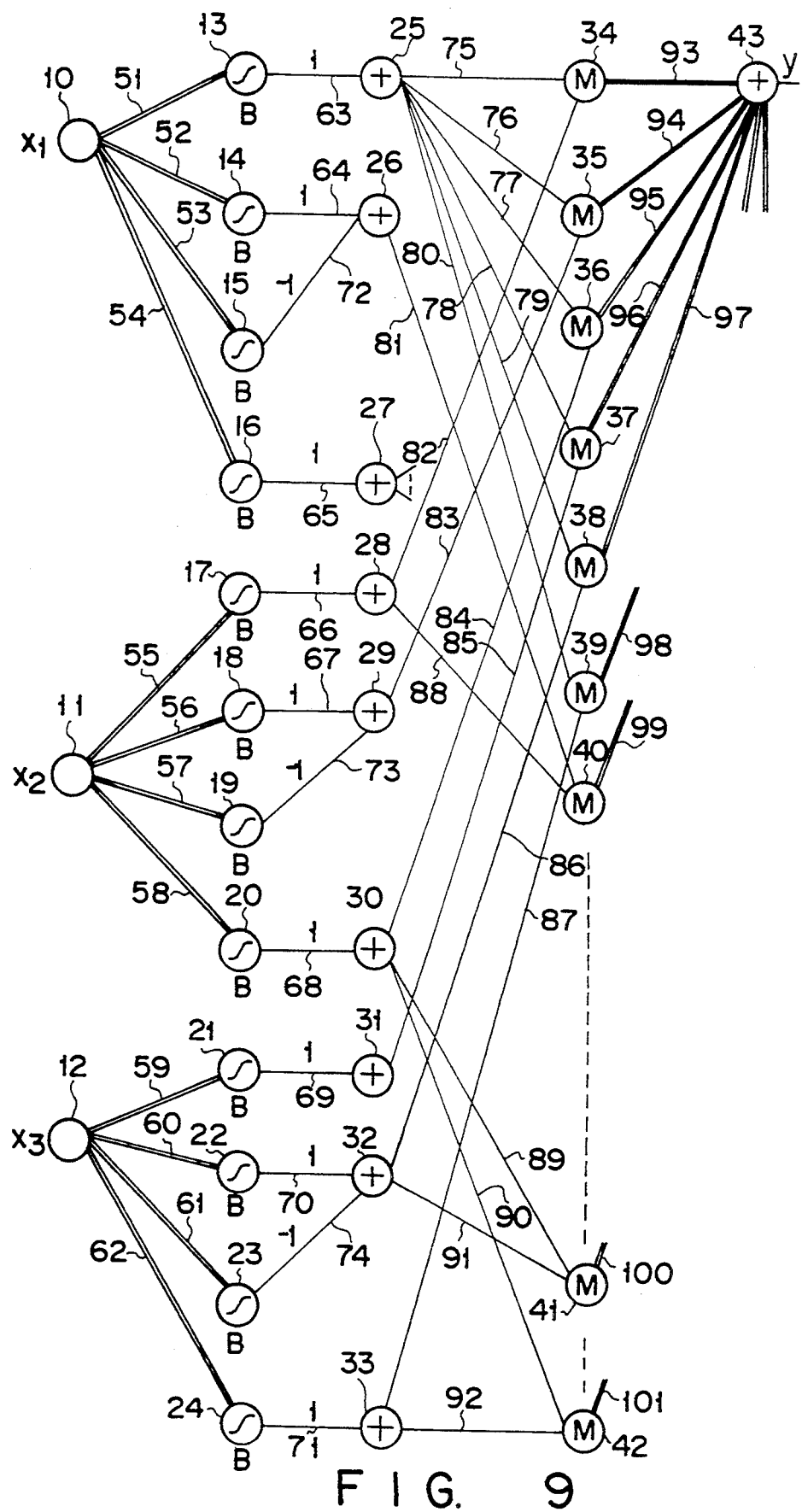
FIG. 9 is a schematic diagram of a third embodiment of the neural network according to the present invention.

Though the above embodiments calculate the center of gravity, this calculation can be omitted if the denominator of equation (3) is constant in every occasion. FIGS. 9 and 10 illustrate third and fourth embodiments which are the modifications of the first and second embodiments and in which equation (3) is changed to a following equation (3').

$$y = \sum_{i=1}^{n} \omega_i \cdot y_i \quad (3')$$

FIG. 9 schematically illustrates the neural network whose then-part is expressed in a form of a constant as denoted by equation (2). In this network, the neuron 44 in the fifth layer and the neuron 45 in the sixth layer of the first embodiment are canceled. Therefore, the output from the fifth layer neuron 43 becomes an output y and unnecessary connections are canceled.

FIG. 10 schematically illustrates the neural network whose then-part is expressed in a form of a linear expression as denoted by equation (2'). In this network, the neurons 116 to 118 in the intermediate layer 4A, the fifth layer neuron 44, and the sixth layer neuron 45 of the second embodiment are canceled. Therefore, the output from the fifth layer neuron 43 becomes an output y and unnecessary connections are canceled.

The calculation and training of the third and fourth embodiment are the same as in the first and second embodiments. In these embodiments, it is necessary to determine the if-part of the fuzzy rule such that the denominator of equation (3) is constant in every occasion. As a result, the number of rules is increased and many restrictions are applied to the membership function. The increase of the number of rules leads to the increase of the number of neurons, thereby making the generalization difficult. The generalization of the neural network becomes difficult if the identification is performed with a large number of the fuzzy rules in order to make error small.

Therefore, it is desired to simplify the rules in the third and fourth embodiments. The fuzzy rules can be simplified by making the if-part simple. It is assumed that the following three conditions A, B, and C are included in the if-part.

$x_1$ is small and $x_2$ is small (A)
$x_1$ is small and $x_2$ is medium (B)
$x_1$ is small and $x_2$ is big (C)

If the variable $x_2$ is omitted, then the condition is simplified as follows.

$x_1$ is small (D)

However, if the neural network is trained by means of the above four if-parts, the network cannot be converged to the condition D and is equally distributed to the conditions A to D due to the distributed memory characteristic of the neural network.

The present invention thus corrects the weight of the connections between the if-part and the then-part and in order to improve the above drawback. A following function fw is introduced of which value is increased to 1 when the absolute value of the weight is large and is decreased to 0 when the absolute value of the weight is decreased to 0.

$$f_w(w/c) = 1 - e^{-(w/c)^2} \quad (20)$$

By partially differentiating equation (20), the following equation is obtained.

$$\partial f_w/\partial w = (2w/c^2) \cdot e^{-(w/c)^2} \quad (21)$$

FIG. 11A illustrates equation (21). As seen from FIG. 11A, equation (21) is a symmetrical function having a positive peak at $w/c = 0.7$ and a negative peak at $w/c = -0.7$. The reference symbol c denotes a constant.

In this case, the equation representing a change of the weight of connection is given as follows by adding a third term to the right hand side of equation (12).

$$\Delta w^K{}_{ij} = \eta \cdot \delta^k{}_j \cdot O^{k-1}{}_i + \alpha \cdot \Delta w^*{}^k{}_{ij} + \beta \cdot (\partial f_w/\partial w) \quad (13')$$

where b is a negative constant.

In this way, when the value of w/c approximates 0, the weight is converged to 0. On the other hand, when the value of w/c is apart from 0, in other words, when it has a significant meaning, the effect convergence is small. In other words, when w/c is converged to 0, the weight is also converged to 0. By this way, only the rule D has a value other than 0 and the remaining rules A to C has a value approximates 0.

For example, only the connections 93 and 94 have the value other than 0 and the remaining connections have a value of nearly 0 in the case of FIG. 9. Therefore, the neurons preceding to the connections 95 to 101 can be omitted since they are not necessary. Therefore, the network can be simplified and the generalization can be facilitated.

Contrary to this, in the case of FIG. 1, even if the connections 95 to 101 have a value of nearly 0, the neurons preceding to the connections 95 to 101 cannot be omitted since the connections 104 and 105 to 110 are connected to the neuron 44 with a weight of 1 in order to calculate the center of gravity.

As described above, the third and fourth embodiments shown in FIGS. 9 and 10 have the advantage of a smile construction of the neural network.

The reference symbol c of w/d is a constant which is determined by the effective range of the output y. It is nonsense to set the positive and negative peaks at 0.7 and −0.7 with respect to w in the both cases in which the output y greatly changes and the output y changes between the range of 0 to 1. Therefore, the parameter c is incorporated in order to normalize the parameter w.

A variety of modifications of the function $f_w$ can be used. One example of the function $f_w$ is given as follows.

$$f_w(w/c) = (w^2/c^2)/(1+w^2/c^2) \quad (20')$$

$$\partial f_w/\partial w = (2w/c^2)/(1+w^2/c^2)^2 \quad (21')$$

Another modification of the function $f_w$ is given as follows and shown in FIG. 11B.

$$\partial f_w/\partial w = e^{-(w/c)} \quad (w \geq 0)$$
$$= e^{+(w/c)} \quad (w < 0) \quad (21'')$$

It is to be noted that the function denoted by equation (21'') is oscillated around w=0 during the training. Therefore, w is set to 0 when w is sufficiently reduced. However, there is a case in which the countermeasure for the oscillation must be provided. In the case of FIG. 10, the weights of connections 140 to 148 are changed through training in accordance with equation (13').

As described above, since it is necessary for the third and fourth embodiments to provide a large number of fuzzy rules, not only the if-part and then-part are determined, but also the rules must be converged to a simple form. In order to simplify the neural network, there is provided first the rules in which the if-part includes one condition (without the "and" expression) or two conditions (two conditions are combined by the "and" expression). Then, a different rule is added and training is performed according to equation (13'). As a result, the then-part of the unnecessary rules become 0 and the unnecessary rules can be omitted. Moreover, the third and fourth embodiments do not calculate the center of gravity so that the interpolation effect is not obtained. The training according to equation (13') is also necessary due to this reason.

As described, in addition to the five advantages obtained in the first embodiment, there are advantages of the third and fourth embodiments as follows. When the function making the weight of connection of the then-part 0 when the weight is substantially 0 is incorporated into a weight changing equation (13'), many rules can be converged into a less number of rules in a simple form and thus the unnecessary rules are omitted to facilitate the generalization.

It is also possible to make the meaningless weight of connections 0 using equation (13') in the first and second embodiments.

In the above embodiments, the neural network is described as the network for fuzzy reasoning. However, the present invention can be embodied by a general neural network. That is, it is possible to provide a neural network having a multiplication/division function type neuron in addition to a normal sigmoid type and linear addition type neurons.

FIG. 12 shows a fifth embodiment which is not for fuzzy reasoning and includes a multiplication/division type neurons in addition to a normal sigmoid type neurons. The fifth embodiment is shown as a three-layered neural network. In the network, neurons 204, 204, and 209 have a multiplication/division function. The neuron 204 multiplies the inputs $x_1$ and $x_2$. The neuron 205 divides the input $x_2$ by the input $x_3$. Though each neuron in a given layer may be connected to all neurons in adjacent layers, each neuron is connected to the given neuron or neurons in the adjacent layers in FIG. 12.

On the other hand, if the weights of connections 210, 211, and 213 are fixed to 1, the neurons 204 and 205 can output a predetermined values, such as $x_1 \times x_2$ and $x_2/x_3$. Therefore, if the knowledge such that the calculations of $x_1 \times x_2$ and $x_2/x_3$ must be incorporated in the neural network is obtained previously, it is possible to perform training of the neural network in an easy and precise manner in a short period of time by incorporating the neurons for calculating these values in the neural network than by applying many training data including these calculations.

Further, though it is known that the multiplication and division operations can be realized by the multi-layered, at least three-layered neural network, training of a multi-layered neural network with a multiplication/division function is difficult and the number of neurons becomes large.

Therefore, if it is known as the knowledge that the multiplication/division is necessary, it is desirable to clearly incorporate this calculation into the neural network in order to shorten the time period for training. The reason why the conventional neural network cannot incorporate the calculation is that there is no training algorithm for the multiplication/division type neuron. According to the present invention, the training for the multiplication/division type neuron can be performed as described above.

As described above, according to the present invention, there is provided a neural network system which can clearly express the knowledge and be easily trained from an initial states which is set by the operator using the human knowledge. According to the present invention, the construction of the neural network is simple and the if-part and the then-part can be trained simultaneously since the if-part and then-part are formed of the same single neural network. Further, the neural network system according to the present invention can be sufficiently generalized.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A neural network system comprising:
   input means for inputting data;
   a multi-layered neural network formed of neurons and connected to said input means, each neuron in each layer connected to at least one other neuron of said multi-layered neural network with a given weight of connection, said multi-layered neural network comprising:
   a multiplication neuron layer connected to said input means via at least one preceding layer, the multiplication neuron layer including multiplication neurons having a multiplication function, having inputs from at least two neurons in said at least one preceding layer, and outputting a product of each of said inputs;
   an addition neuron layer, connected to said multiplication neuron layer, including two addition neurons which perform an addition function, one of the two addition neurons connected to the multiplication neurons with first weights of connection and the other of the two addition neurons connected to the multiplication neurons with second weights of connection; and
   a division neuron layer having a division neuron with two inputs connected to the two addition neurons, said division neuron having a division function and outputting a quotient of the two inputs thereof; and
   means for causing said neural network to perform training to decrease an error such that weights of connections between only some of the neurons are changed.

2. A system according to claim 1, wherein said means for causing said neural network to perform training operates such that only weights of connections between said input means and said at least one preceding layers which precedes the multiplication neuron layer and said first weight of connection between the multiplication neurons of the multiplication neuron layer and said one of the two addition neurons are changed.

3. A system according to claim 1 wherein said means for causing said neural network to perform training changes only weights of connection between said input means and said at least one preceding layer which precedes the multiplication neuron layer, and at least some of the weights of connection between the multiplication neuron layer and the addition neuron layer.

4. A system according to claim 1, wherein said means for causing said neural network to perform training changes at least some of the weights of connection between the addition neuron layer and the multiplication neuron layer.

5. A system according to claim 1, wherein said means for causing said neural network to perform training changes weights of connection between said input means and said at least one preceding layer which precedes the multiplication neuron layer.

6. A neuro-fuzzy inference system for receiving input data representing values of if-part data and for outputting output data representing a value of then-part data, comprising:
   input means for inputting the input data representing the values of the if-part data;
   a neural network formed of neurons connected in a multi-layer manner and connected to said input means, the neural network comprising:
   first neuron layers having neurons connected to said input means and connected to each other in a multi-layered manner with given weights of connection based on an if-part of a fuzzy rule, the first neuron layers including neurons having a multiplication function, having inputs from at least two neurons in a preceding layer, and outputting a product of each of said inputs;
   second neuron layers having neurons connected to the first neuron layers and connected to each other in a multi-layered manner with given weights of connection based on a then-part of the fuzzy rule,
   a first layer of the second neuron layers including two neurons connected to the first neuron layers, and a second layer of the second neuron layers including a neuron having a division function and outputting a quotient of two inputs connected to the two neurons of the first layer of the second neuron layers; and
   training means for causing said neural network to perform training to decrease an error such that weights of connections between only some of the neurons are changed.

7. A system according to claim 6, in which said training means comprises:
   means for changing weights of connections of neurons in said second neuron layers to zero when an absolute value of the weights of connections of neurons in said second neuron layers are less than a predetermined value.

8. A system according to claim 6, wherein said training means for causing said neural network to perform training changes only the weights of connections between said input means and said neural network formed of neurons connected in a multilayer manner and the weights of connections between one of said two neurons of the first layer of the second neuron layers and the neurons of the first neuron layers having the multiplication function.

9. A system according to claim 6, wherein said training means for causing said neural network to perform training changes only the weights of connections between said neural network formed of neurons connected in a multilayer manner and said input means, and the weights of connections between the first layer of the second neuron layers and a layer of said first neuron layers connected to said first layer of the second neuron layers.

10. A system according to claim 6, wherein said training means for causing said neural network to perform training changes the weights of connection between the neurons having the multiplication function of the first neuron layers and the first layer of the second neuron layers.

11. A system according to claim 6, wherein said training means for causing said neural network to perform training changes the weights of connections between said input means and said neural network formed of neurons connected in a multi-layered manner.

12. A neuro-fuzzy inference system for receiving input if-part data and for outputting an output representing a value of then-part data, comprising:
    input means for inputting the input if-part data;

a neural network formed of neurons connected to said input means and connected in a multi-layered manner, the neural network comprising:

a group of neuron layers having neurons connected to said input means;

a multiplication neuron layer having multiplication neurons, the neurons of said group of neuron layers and multiplication neurons connected to each other with given weights of connections based on an if-part of a fuzzy rule, each of said multiplication neurons connected to two of said neurons of said group of neuron layers, the multiplication neurons having a multiplication function which outputs a product of each of said inputs thereto;

an addition neuron layer having a neuron connected to the multiplication neurons with given weights of connections based on a then-part of the fuzzy rule, the neuron of the additional neuron layer having an addition function and outputting a signal representing a sum of products of outputs of the multiplication neurons and the weights of connections between the multiplication neurons and the neuron of the addition neuron layer; and training means for causing said neural network to perform training to decrease an error such that weights of connections between only some of the neurons are changed, weights of connections of an output of the multiplication neuron layer is changed to zero when an absolute value of the weights of connections is smaller than a predetermined value, and a part of the neural network which precedes the connection whose weight is changed to nearly zero is disconnected from the network.

13. A neural network for performing a neuro-fuzzy inference, comprising:

input means for inputting data;

an if-part processing network comprising first through fourth if-part processing layers;

said first if-part processing layer comprising processors connected between the input means and the second if-part processor layer, the connections between the first if-part processor layer and the second if-part processor layer being through variable weights of connection;

said second if-part processing layer connected between said first if-part processor layer and said third if-part processor layer, said second if-part processor layer comprising sigmoid processors, and the connections between the second if-part processor layer and the third if-part processor layer being by non-adjustable strength connections, the processors in said second if-part processor layer having only one input;

said third if-part processor layer connected between said second if-part processor layer and said fourth if-part processor layer, the connections between the third if-part processor layer and said fourth if-part processor layer being non-adjustable strength connections, said third if-part processor layer comprising adder processors;

said fourth if-part processor layer connected to said third if-part processor layer, said neurons of said fourth if-part processor layer comprising multiplier processors having at least two inputs from two different processors in said third if-part processor layer;

said neural network system comprising a then-part processing network connected between said if-part processing network and an output means, said then-part processing network comprising fifth and sixth processing layers;

said fifth processing layer connected between said fourth processing layer of said if-part processing network and said sixth processing layer, said fifth processing layer comprising adder processors;

said sixth processing layer comprising one processor connected between said fifth processing layer and said output means and also comprising one multiplication processor having a division input from a processor of said fifth processing layer, connections between said fifth processing layer and said sixth processing layer comprising non-adjustable strength connections.

14. A neural network of a multi-layered type for a fuzzy reasoning in which an if-part of a fuzzy rule is expressed by a membership function and a then-part of the fuzzy rule is expressed by a linear expression, the network comprising:

input means for inputting data;

a first neural network, connected to the input means, having first neurons for receiving if-part variables of all fuzzy rules and calculating if-part membership values of all the fuzzy rules;

a second neural network formed of second neurons, connected to the first neurons with a given weight of connection based on the if-part of the fuzzy rules, for calculating, as a truth value of a premise of each fuzzy rule, a product of the if-part membership values for all the if-part variables; and a third neural network, connected to the second neural network with a given weight of connection based on a then-part of the fuzzy rule, the third neural network having a neuron for calculating a first sum of the truth value of the premise of all the fuzzy rules, a neuron for calculating a second sum of a product of the truth values of the premise of all the fuzzy rules and the-part outputs of all the fuzzy rules, and a neuron for calculating a division of the second sum by the first sum to obtain a quotient as an inferential result;

output means connected to the third neural network, for outputting said quotient as output data; and training means for causing said neural network for a fuzzy reasoning to perform training to decrease an error such that a weight of connection between the first neural network and said input means and a weight of connection between the second neural network and the third neural network are changed, and a weight of connection between the second neural network and the first neural network is not changed.

15. A neural network of a multi-layered type for a fuzzy reasoning in which an if-part of a fuzzy rule is expressed by a membership function and a then-part of the fuzzy rule is expressed by a linear expression, the network comprising:

input means for inputting data;

a first neural network, connected to the input means, having first neurons for receiving if-part variables of all fuzzy rules and calculating if-part membership values of all the fuzzy rules;

a second neural network formed of second neurons, connected to the first neurons with a given weight of connection based on the if-part of the fuzzy rules, for calculating, as a truth value of a premise of each fuzzy rule, a product of the if-part membership values for all the if-part variables;

a third neural network, connected to the second neural network with a given weight of connection based on a then-part of the fuzzy rule, the third neural network having a neuron for calculating a first sum of the truth value of the premise of all the fuzzy rules, a neuron for calculating a second sum of a product of the truth values of the premise of all the fuzzy rules and then-part outputs of all the fuzzy rules, and a neuron for calculating a division of the second sum by the first sum to obtain a quotient as an inferential result; and output means connected to the third neural network, for outputting said quotient as output data, wherein:
said first neurons include neurons having a sigmoid function and neurons having a linear addition function;

said second neurons include neurons having a multiplication function; and said third neural network includes two neurons having a linear addition function and a neuron having a division function.

* * * * *